United States Patent Office 3,658,987
Patented Apr. 25, 1972

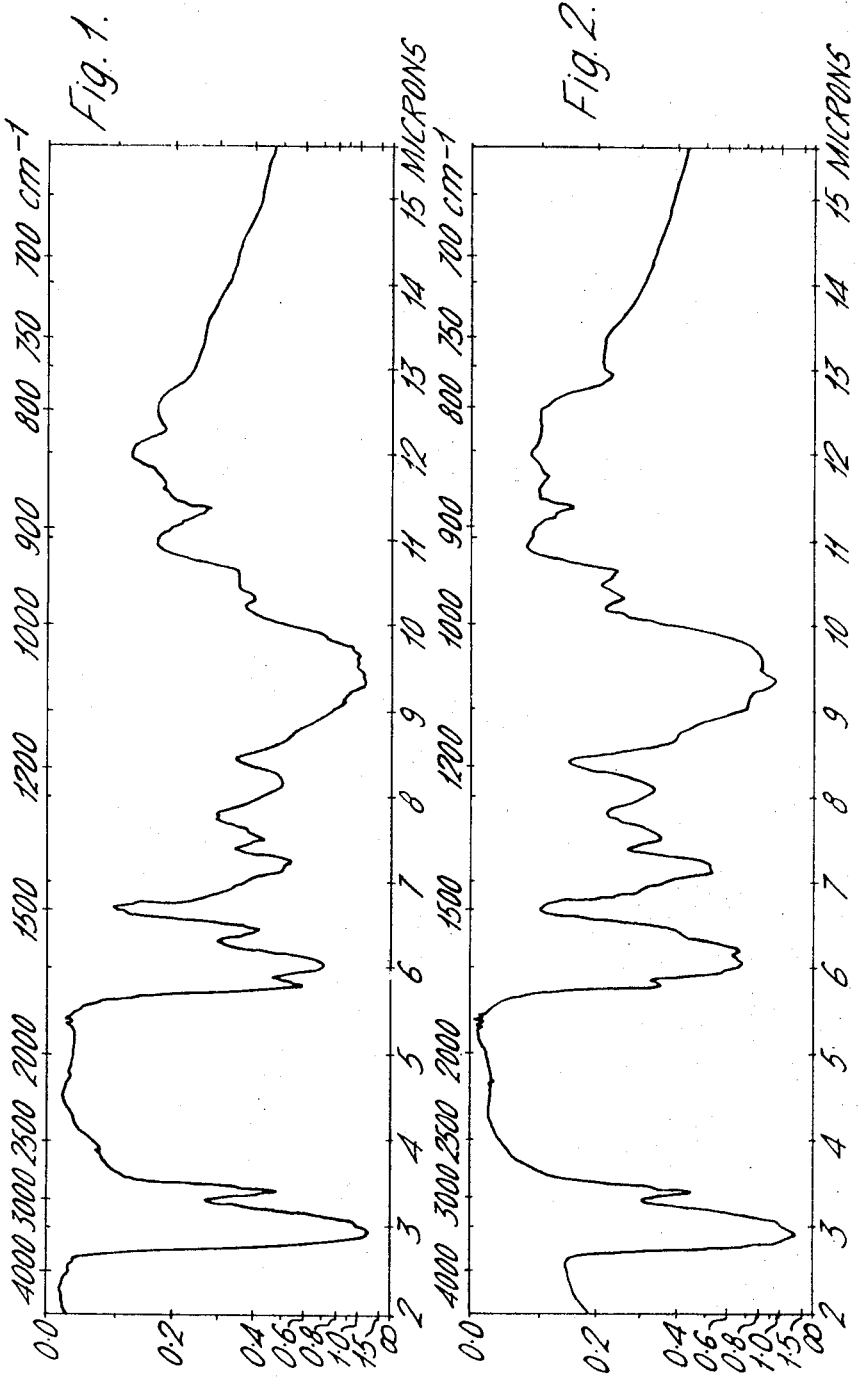

3,658,987
ANTIBIOTIC 8036 R.P. AND PROCESS FOR THE PRODUCTION THEREOF
Denise Mancy, Charenton, and Leon Ninet and Jean Preud'homme, Paris, France, assignors to Rhone-Poulenc S.A., Paris, France
Filed Nov. 15, 1965, Ser. No. 507,773
Claims priority, application France, Nov. 18, 1964, 995,376
Int. Cl. A61k 21/00
U.S. Cl. 424—118
10 Claims

ABSTRACT OF THE DISCLOSURE

The invention provides the new antibiotic 8036 RP which has bacteriostatic properties especially against gram-positive microorganisms, e.g. streptococci. The new antibiotic is isolated from aerobic culture media of *Streptomyces canadiensis* NRRL 3155.

---

This invention relates to antibiotics and their manufacture.

The invention provides a new antibiotic, hereinafter referred to as 8036 R.P., and a process for its preparation. This new antibiotic is of special interest because of its high antibacterial activity against Gram-positive microorganisms. It is obtained from culture media of the microorganism which is characterised in detail below, belonging to the streptomyces genus and designated as "*Streptomyces canadiensis*."

8036 R.P. is very soluble in water, soluble in dimethylformamide, pyridine and acetic acid, and sparingly soluble or insoluble in ethanol, acetone, chloroform, and n-hexane. A 1% (w./v.) aqueous solution of 8036 R.P. is stable at pH 6 to pH 10; the solutions retain at least 90% of their activity after one week at 25° C. and at least 70% after one week at 37° C.

8036 R.P. gives negative tests in the following reactions: biuret reaction, Millon reaction, Pauly reaction, Adamkiewicz reaction, Ehrlich-Salkowsky reaction, reaction with ferric chloride, xanthoproteic reaction, ferric maltol reaction, Tollens reaction, Morner reaction, Zimmermann and Bitto reaction, and diazotisation reaction. It gives positive tests with the following reactions: ninhydrin reaction (weakly positive before hydrolysis; very strong after acid hydrolysis), Molish reaction, Folin-Denis reaction, Sakaguchi reaction after acid hydrolysis, reaction with potassium permanganate before hydrolysis (negative test after hydrolysis), reaction with 2,4-dinitrophenylhydrazine after acid hydrolysis, Fehling reaction after acid hydrolysis, Bial reaction, Tauber reaction, Elson-Morgan reaction after acid hydrolysis, Dische and Borenfreund reaction, Selifanoff-Roe reaction, Pechmann reaction, reaction with indole in sulphuric acid solution, reaction with cysteine-carbazole, reaction with potassium ferricyanide and ferric chloride. It does not undergo any colour reaction with concentrated sodium hydroxide, with concentrated sulphuric acid, with concentrated hydrochloric acid, and with concentrated phosphoric acid.

8036 R.P. is a strong acid, the neutralisation equivalent of which, measured by potentiometric titration with sodium hydroxide, is 775 (pKa, 4.45). Its molecular weight appears to be greater than 5,000 because it does not dialyse through a regenerated cellulose membrane (of the "Cellophane" type).

8036 R.P. contains carbon, hydrogen, oxygen, nitrogen and phosphorus; its elementary composition is as follows (percent): C, 47.9, H, 7.1, C, 38.2% (by difference), N, 4.5, P, 2.2%. It has the following physical properties:

Appearance: amorphous white powder;
Melting point: 235–236° C. with decomposition (browning at temperatures higher than 180° C.);
Ultra-violet spectrum (determined using a 50 mg./l. solution, i.e. 0.005%, in water of 1 cm. thickness): shows no characteristic maximum; the absorption coefficient $$E^{1\%}_{1\,cm.}$$

increases from zero to 40 from 400 to 210 millimicrons;
Infra-red spectrum (determined using a tablet of a mixture with potassium bromide): this spectrum is shown in FIG. I of the accompanying drawings in which the lower scale on the abscissa is the wave length expressed in microns and the upper scale is the wave number in cm.$^{-1}$, and the ordinates give the optical density.

The principal infra-red absorption bands of 8036 R.P. are as follows:

| | | |
|---|---|---|
| 3400 vs. | 1380 s. | 945 sh. |
| 2930 s. | 1335 s. | 880 s. |
| 1725 s. | 1225 s. | 855 sh. |
| 1660 s. | 1150 sh. | 815 m. |
| 1650 s. | 1100 sh. | 775 sh. |
| 1550 s. | 1070 vs. | 755 sh. |
| 1445 sh. | 1032 sh. | |
| 1400 sh. | 970 s. | | where:
vs.=very strong
s.=strong
m.=medium
sh.=shoulder

The salts, especially the alkali metal salts, of 8036 R.P. with bases are within the scope of the invention. The sodium salt of 8036 R.P. has the elementary composition (percent): C, 45.3, H, 6.7, O, 38.55 (by difference), N, 4.2, P, 2.1, Na, 3.15. It has the following physical properties:

Appearance: white amorphous powder:
Ultra-violet spectrum (determined using a 50 mg./l. solution in water of 1 cm. thickness); does not show any characteristic maximum; the absorption coefficient $$E^{1\%}_{1\,cm.}$$

increases from zero to 60 over the interval of 400 to 210 millimicrons.
Infra-red spectrum (determined using a tablet of a mixture with potassium bromide): this spectrum is shown in FIG. II in which the lower scale of the abscissa is the wave length expressed in microns and the upper scale is the wave number in cms.$^{-1}$, and the ordinates give the optical density.

The principal infra-red absorption bands of this salt are as follows:

| | | |
|---|---|---|
| 3430 vs. | 1455 sh. | 968 s. |
| 2940 s. | 1330 s. | 943 s. |
| 1725 s. | 1238 s. | 890 sh. |
| 1660 s. | 1150 sh. | 882 m. |
| 1645 s. | 1100 sh. | 855 m. |
| 1610 s. | 1070 vs. | 820 m. |
| 1555 sh. | 1045 sh. | 776 s. | where:
vs.=very strong
s.=strong
m.=medium
sh.=shoulder

Analysis by ascending chromatography on paper at 25° C., followed by developing the chromatograms by diffusion on an agar plate inoculated with *Staphylococcus auereus*, gives only a single area of activity with the several solvent systems employed. The $R_f$ values obtained, which are the ratio of the displacement of the antibiotic relative to the displacement of the solvent front, are as follows:

Light phase of a mixture of n-butanol-acetic acid-water (6°:40:10 by volume). $R_f=0.40$;
Light phase of a mixture of ethyl acetate-acetic acid-water (30:30:10 by volume): $R_f=0.45$;
n-Propanol-water (70:30 by volume): $R_f=0.40$;
Ethyl acetate-formamide-pyridine (60:40:10 by volume): $R_f=0.35$.

The bacteriostatic activity of 8036 R.P. towards a number of microorganisms has been determined by a conventional dilution method. For each microorganism there was determined the minimum concentration of antibiotic at which under defined conditions inhibited all visible development of the microorganism in an appropriate nutrient broth. The results of various determinations are summarised in Table I in which the minimum bacteriostatic concentrations of the new antibiotic are expressed in micrograms of substance per cc. of test nutrient medium.

TABLE I

| Bacterial Organisms tested: | Minimum bacteriostatic concentration in µg./cc. |
|---|---|
| *Staphylococcus aureus*, strain 209 P–ATCC 6538 P | 0.95 |
| *Staphylococcus aureus*, strain 133 (Institut Pasteur) | 0.50 |
| *Staphylococcus aureus*, strain Smith | 1 |
| *Sarcina lutea*—ATCC 9341 | 70 |
| *Streptococcus faecalis*—ATCC 9790 | >250 |
| *Streptococcus viridans*—(Institute Pasteur) | 1.1 |
| *Streptococcus pyogenes hemolyticus* (strain Dig 7, Institut Pasteur) | 0.01 |
| *Neisseria gonorrhaeae* (A 50—Institut Pasteur) | 0.6 |
| *Neisseria meningitidis* (5813 Institut Pasteur) | 0.6 |
| *Diplococcus pneumoniae* (strain Til, Institut Pasteur) | 0.08 |
| *Bacillus subtilis*—ATCC 6633 | 30 |
| *Mycobacterium species*—ATCC 607 | 50 |
| *Mycobacterium para-smegmatic* (A 75—Lausanne) | 160 |
| *Escherichia coli*—ATCC 9637 | 35 |
| *Shigella dysenteriae*—Shiga L (Institut Pasteur) | 90 |
| *Salmonella paratyphi* A (Lacess, Institut Pasteur) | 165 |
| *Salmonella schottmuelleri* (parathyphi B) Fougenc (Institut Pasteur) | 70 |
| *Proteus vulgaris* | 165 |
| *Klebsiella pneumoniae*—ATCC 10,031 | 90 |
| *Pseudomonas aeruginosa* (strain Bass—Institut Pasteur) | 45 |
| *Brucella bronchiseptica* (CN–387—Wellcome Institut) | 20 |
| *Pasteurella multocida* (A 125, Institut Pasteur) | 2.5 |
| Reiter's treponema | 10 |
| *Bacillus cereus* ATCC 6630 | 0.01 |

These various determinations show that the bacteriostatic activity of 8036 R.P. is directed principally towards microorganisms which accept the Gram staining, its activity against *Streptococcus hemolyticus* being particularly strong. It is relatively inactive against Gram-negative microorganisms though its activity against *Neisseria meningitidus* is appreciable. No cross-resistance is noticeable with the following antibiotics: penicillin, streptomycin, tetracycline, chloromphenicol, spiramycin, carbomycin, erythromycin, pristinamycin and novobiocin. The results of various determinations of bacteriostatic concentrations of 8036 R.P. against different strains of staphylococcus that are resistant to one or more of the antibiotics mentioned above and summarised in Table II where there are shown for purposes of comparison the bacteriostatic concentrations against three strains of staphylococcus (marked (s)) sensitive to all these antibiotics (also listed in Table I).

TABLE II

| Strains of *Staphylococcus aureus* tested: | Minimum bacteriostatic concentrations (µg./cc.) |
|---|---|
| Strain 209 P—ATCC 6538 P (s) | 0.95 |
| Strain 209 P—rendered resistant to spiramycin | 0.75 |
| Strain 209 P—rendered resistant to carbomycin | 0.55 |
| Strain 209 P—rendered resistant to pristinamycin | 1 |
| Strain 209 P—rendered resistant to novobiocin | 0.30 |
| Strain 209 P—rendered resistant to chloromphenicol | 0.40 |
| Strain 133 (Institut Pasteur) (s) | 0.50 |
| Strain Smith (s) | 1 |
| Strain $B_3{}^1$ (resistant to penicillin and streptomycin) | 0.70 |
| Strain $Hb^1$ (resistant to penicillin and tetracycline) | 0.90 |
| Strain Beaujon $3^1$ (resistant to penicillin, streptomycin, tetracycline and chloramphenicol) | 0.95 |
| Strain MB $1^1$ (resistant to penicillin and erythromycin) | 0.55 |
| Strain Lavault $^1$ (resistant to penicillin, erythromycin and spiramycin) | 0.65 |

$^1$ Strains isolated clinically.

The antibacterial activity of 8036 R.P. has been confirmed by in vivo tests on laboratory animals infested with microorganisms such as streptococci, pneumoccoci, staphylococci and Neisseriae (*Neisseria meningitidis*). It is particularly effective in the case of mice by subcutaneous administration.

It has a very prolonged period of activity which makes it a very good prophylactic agent. This prophylactic activity has been demonstrated towards streptococcal infections of the mouse. Thus, for example, a single dose of 50 mg./kg. of 8036 R.P. administered subcutaneously protected all mice from intraperitoneal infection by streptococci for 14 days after administration of the antibiotic. Benzathine-penicillin G at a dose of 250 mg./kg. administered subcutaneously protects mice only for 24 hours.

The toxicity of 8036 R.P. has been studied in the mouse. The 50% lethal dosage ($LD_{50}$) determined subcutaneously is 1 g./kg., and thus the antibiotic is of very low toxicity.

The organism which produces the antibiotic 8036 R.P. belongs to the genus Streptomyces and is called "*Streptomyces canadiensis.*" It has been deposited at the Northern Regional Research Laboratory of Peoria, Ill., United States of America. The organism was isolated from a soil sample taken at Sainte Marthe (Vaudreuil County), in the province of Quebec, Canada, in the following classical manner. The soil sample was suspended in sterile distilled water and then the suspension diluted to different concentrations; small volumes of each dilution were respectively spread over the surface of Petri dishes containing a suitable agar nutrient medium. After several days incubation at 26° C., the colonies of microorganisms to be isolated were pricked out onto agar slopes to obtain more abundant cultures.

The classification in "Bergey's Manual of Determinative Bacteriology" (7th edition [1957], The Williams & Wilkins Company, Baltimore) for the genus Streptomyces gives no description of any species of which the culture characteristics and biochemical properties correspond with those of the organism that produces the antibiotic 8036 R.P. Therefore, this producer-organism has been considered to be a new species and named *Streptomyces canadiensis* by virtue of its place of origin.

*Streptomyces canadiensis* forms cylindrical spores of 0.4 to 0.6μ width and 0.8 to 1.2μ length. Its sporiferous filaments are straight and only occasionally undergo a slight flexuous movement over a part of their length, or at their end; the filaments are very long, commonly exceeding 100μ in length.

*Streptomyces canadiensis* displaying a sporulated aerial system of a pink-grey colour; its characteristic colour is clearly seen particularly on certain starch media where sporulation is good, and enhanced further by the presence of soil.

The cultural characteristics and biochemical properties of *Streptomyces canadiensis* have been examined on nutrient agars and nutrient broths generally used for examining the appearance of streptomyces strains. The observations made are shown in Table III; where no specific comments are made, they refer to cultures obtained after two to three weeks at 26° C. when a good state of development has been reached. The majority of the culture media employed were prepared following the formulae indicated in "The Actinomycetes," S. A. Waksman, Waltham, Mass., United States of America, Chronica Botanica Company, 1950; pp. 193–197, where this applies there will be found the letter W followed by the number accorded them in "Then Actinomycetes." The references or compositions of the other culture media are as follows:

TABLE III

| Culture medium | Degree of development | Vegetative mycelium or underside of the culture | Aerial system (comprising total of aerial mycelium and sporulation) | Soluble pigment | Observations and biochemical properties |
|---|---|---|---|---|---|
| Bennett's agar (Ref. A) | Good | Light yellowish brown. Very well developed. | Nil | Light yellowish brown | |
| Emerson's agar (W–23) | do | do | Nil | do | |
| Maltose-tryptone agar (Ref. B) | do | Yellowish brown. Well developed | Light grey. Moderate development | Deep yellowish brown | |
| Glucose-peptone agar (W–7) | do | Yellowish brown turning to blackish grey in places. Well developed. | Nil | Grlish yellow brown | |
| Nutrient agar (W–5) | Poor | Greyish yellow. Poor | Nil | Nil | |
| Glucose-asparagine agar (W–2) | Good | Underside yellowish brown | Light pinkish grey. Moderate development. | Light yellowish brown | |
| Glycerine-asparagine agar (W–3) | do | Light brownish yellow to light yellowish brown. Very well developed. | Light grey slightly pink. Moderate development. | do | |
| Krainsky's calcium malate agar Ref. C) | Very moderate | Greyish white to yellowish white. Very moderate. | Nil | Nil | Calcium malate is solubilised. |
| Tyrosine agar (Ref. D) | Poor | Colourless to light brownish grey. Very moderate development. | Nil | Weak light brownish | No solubilisation of the tyrosine visible. |
| Starch agar (W–11) | Moderate | Underside light yellowish brown | Light grey. Moderate development | Light greyish yellowy-brown | Positive hydrolysis of starch. |
| Grundy's starch agar (Ref. E) | Medium | do | Light pinkish grey. Medium development. | do | |
| Pridham's starch agar (Ref. F) | Good | Yellowish brown. Very well developed | Light pinkishgrey. Moderate development. | Brownish grey yellow | Do. |
| Czapek's synthetic glycerin agar (Ref. G) | do | Brownish yellow. Well developed | Nil | Fairly intense yellow, slightly brownish. | |
| Czapek's synthetic sucrose agar (W–1) | Almost nil | Colourless. Very poor | Nil | Nil | |
| Potato culture (W–27) | Good | Greyish yellow to blackish brown. Well developed. | Whitish to pinkish grey. Moderate development. | Yellowish grey to blackish in the potato particles. The underlying liquid is a light yellow. | |
| Carrot culture (W–28) | Moderate | Greyish yellowy-brown. Moderate development. | Whitish. In traces | Brownish, less intense in the carrot. The underlying liquid is yellow. | |
| 12% Pure gelatin (Ref. H) | Good. Culture well developed on the surface at the point of inoculation. | Underside blackish brown | Grey. Well developed | Yellowish brown, starting from the surface and extending into the liquefaction alone. 00 | Liquefaction of the gelatin positive, but relatively slow; incomplete in a month. |
| Dimmick's glucose-nitrate broth (Ref. I) | Medium | Ring and veil, yellowish white to light yellow. | Nil | Light yellow, fairly copious | Nitrite reaction positive for the first 24 hours of the culture, thereafter rapidly becoming negative. |
| Skimmed milk (Ref. J): | | | | | |
| (a) At 26° C | Fairly good | Well developed yellow ring | Nil | | Slow peptonisation, affecting the upper half the tube in two to three weeks; incomplete in four weeks. No coagulation. No appreciable change in pH over four weeks. |
| (b) At 37° C | Poor | Yellow brown ring, poorly developed | Nil | | No peptonisation, no coagulation, and no appreciable change in pH over four weeks. |
| Tresner and Danga medium (Ref. K) | | | | | Production of hydrogen sulphide negative. |

Ref.: A—K. L. Jones—Journal of Bacteriology, 57, 142, (1949).
B—A. M. Williams and E. McCoy—Applied Microbiology 1, 307, (1953).
C—W. E. Grundy et al.—Antibiotics and Chem., 2, 401 (1952).
D—0.5% peptone-0.3% meat extract-0.5% tyrosine-2% agar.
E—W. E. Grundy et al.—Antibiotics and Chem. 1, 310, (1951).
F—Inorganic salts-starch agar — T. G. Pridham et al.—Antibiotics Annual, 1956–1957, pp. 947–953.
G—Corresponds to formula W-1, except that 30 g. of sucrose are replaced by 15 g. of glycerin.
H—"Plain gelatin"—prepared following the instructions of "Manual of Methods for Pure Culture Study of Bacteria"—Society of American Bacteriologists, Geneva, N.Y.—$II_{50}$–18.
I—"Manual of Methods for Pure Culture Study of Bacteria"—Society of American Bacteriologists, Geneva, N.Y., $II_{50}$–19.
J—Commercial skimmed milk powder, reconstituted as instructed by the manufacturer.
K—H. D. Tresner and F. Danga—Journal of Bacteriology, 76, 239–244, (1958).

*Streptomyces canadiensis*, the aerial sporulation appearance of which is of a pinkish grey colour and which produces a soluble more or less deep brown pigment on gelatin as well as on the majority of organic media, resembles in respect of these properties the strains constituting group 7—page 748 of Bergey's Manual of Determinative Bacteriology, 7th edition; these strains, which number three, are: *Streptomyces lavendulae*, *Streptomyces venezuelae* and *Streptomyces virginiae*. However, the characteristics of *Streptomyces canadiensis* distinguish it from these three strains quoted above. For one thing, *Streptomyces lavendulae*, in contrast to *Streptomyces canadiensis*, forms spirals and its vegetative growth on synthetic agar is colourless. For another, *Streptomyces virginiae* and *Streptomyces venezuelae*, which themselves both produce straight sporophores like *Streptomyces canadiensis*, always produce a white to cream vegetative growth on the majority of synthetic media, without producing a soluble pigment, whilst on these media *Streptomyces canadiensis* develops a brownish yellow to yellowish brown vegetative mycelium, and produces a soluble brown pigment.

According to the principle of the method of Pridham and Gottlieb (Journal of Bacteriology, 56, 107–114, 1948), *Streptomyces canadiensis* readily utilises the following substances as carbon sources: xylose, arabinose, rhamnose, glucose, galactose, lavulose, mannose, lactose, maltose, trehalose, cellobiose, raffinose, dextrin, starch, glycogen, glycerine, mannitol and inositol. The following substances are not utilised significantly: sorbose, sucrose, erythritol, adonitol, dulcitol and sorbitol.

According to a feature of the invention, the antibiotic herein designated 8,036 R.P. is produced by aerobically cultivating *Streptomyces canadiensis*, or an 8036 R.P.-producing mutant thereof, on an aqueous nutrient medium containing assimilable sources of carbon, nitrogen and inorganic substances, and separating the antibiotic 8036 R.P. formed during the cultivation.

*Streptomyces canadiensis* can be cultivated by any of the known surface or submerged aerobic culture methods, the latter methods being preferred because they are more convenient. Conventional types of apparatus currently used in the fermentation industry may be employed. In particular the following sequence of operations may be adopted:

*Streptomyces canadiensis*—stock
↓
culture on agar
↓
culture in an agitated flask
↓
inoculum culture in fermentation vessels
↓
production culture in fermentation vessels.

The fermentation medium must contain assimilable sources of carbon, nitrogen and inorganic substances, and optionally growth-promoting factors; all these ingredients may be supplied as well defined products or complex mixtures, such as are found in natural biological products of various origins.

As sources of assimilable carbon there may be used carbohydrates such as glucose, lactose, dextrins, starch and molasses, and other carbon-, hydrogen- and oxygen-containing substances such as the sugar alcohols, e.g. mannitol, or certain organic acids, such as lactic, citric and tartaric acids. Certain animal or vegetable oils such as lard oil or soybean oil may be advantageously used instead of, or in admixture with, carbon-, hydrogen- and oxygen-containing substances.

A very wide range of suitable sources of assimilable nitrogen is available. The source may be very simple chemical compounds such as nitrates, mineral or organic ammonium salts, urea, or aminoacids. It may also be complex substances containing a proportion of nitrogen, principally in the form of protein, e.g. casein, lactalbumin, and gluten and their hydrolysates, soybean flour, peanut meal, fish meal, meat extracts, yeast extracts, distillers' solubles and cornsteep liquor.

Of the inorganic substances added some may have a buffering or neutralising effect, such as the alkali metal phosphates or alkaline earth metal phosphates, or the carbonates of calcium or magnesium. Others contribute to the ionic equalibrium needed for the development of *Streptomyces canadiensis* and for the formation of the antibiotic; examples of these are the chlorides and sulphates of alkali and alkaline earth metals. Finally, some act more especially as activators of the metabolism of *Streptomyces canadiensis*; to these belong the salts of zinc, cobalt, iron, copper and manganese.

The pH of the fermentation medium at the start of the culture should be within the range 6.0 to 7.8, and preferably from 6.5 to 7.5. The optimum fermentation temperature is 25–35° C., but satisfactory production is achieved at temperatures from 23° to 38° C. The rate of aeration of the fermentation vessels may vary within quite wide limits, but it has been found that an aeration rate of 0.3 to 2 litres of air per litre of broth per minute is particularly suitable. The maximum yield of antibiotic is obtained after 4 to 9 days of growth, but this period depends predominantly on the medium used.

From the foregoing it will be realised that the general conditions for the culture of *Streptomyces canadiensis* for the production of the antibiotic 8036 R.P. may be widely varied and adapted as appropriate to the circumstances.

8036 R.P. can be isolated from the fermentation media by various methods. In one such method the fermentation medium can be filtered at a pH of 7 or more, but under these conditions an important part of the activity remains in the filter cake and part in the filtrate and both have to be treated in order to extract the active principle. It is therefore preferable to carry out the filtration at a pH below 5 and preferably at about pH 2; under these conditions the active principle remains in the filter cake from which it can be extracted at a pH of from 3 to 7 by water containing a low molecular weight alcohol such as methanol, ethanol or propanol, or a mixture of lower aliphatic alcohols ocntaining at most 5 carbon atoms. The most appropriate solution is a mixture such that after shaking with the damp filter cake its composition is 60% methanol and 40% water, the percentages being by volume. It is also possible to percolate the fermentation medium adjusted to a pH of about 7 through a column containing a strongly basic anion exchange resin of high porosity, followed by elution with an aqueous alcoholic solvent, such as aqueous methanol, containing an electrolyte. The culture medium may also be extracted directly at a pH below 4, and preferably at about pH 2, by means of a low molecular weight alcohol immiscible with water, such as butanol.

The crude product can be isolated from its alcoholic or aqueous alcoholic solution mentioned above by cncentration of the solution to a small volume; this concentration is conveniently preformed at a temperature below 40° C. and under reduced pressure. By cooling and/or addition of a substance which is a poor solvent for 8036 R.P., such as anhydrous ethanol, a ketone, an ether, an ester, a chlorinated compound, benzene or hexane, the crude antibiotic is caused to precipitate. The antibiotic 8036 R.P. can then be purified by fixing it on a strongly basic anion exchange resin of high porosity followed by elution with an aqueous alcoholic solution containing an electrolyte such as the chloride of sodium, ammonium, potassium, calcium or magnesium, added in an amount of 5 to 50 g. per litre of eluant. The eluate can then be concentrated to a small volume at a temperature below 40° C. under reduced pressure, and the concentrate dialysed against a current of distilled water, using a regenerated cellulose membrane. The inorganic salts and other impurities are carried away by the water and 8036 R.P. remains entirely in the dialysed solution. This solution is concentrated azeotropically to a very small volume under reduced pressure after the addition of butanol. The purified antibiotic is precipitated from the aqueous concentrate with a mixture of poor solvents for 8036 R.P. which are miscible with water such as acetone and isopropanol, optionally containing diethyl ether or diisopropyl ether, in proportions such that no separation of phases occurs on mixing with the aqueous phase.

It will be understood that the different methods referred to above can be applied in any desired order, or repeated several times, as required for the production of 8036 R.P. in a form suitable for the application envisaged.

The following non-limitative examples illustrate the invention. In the following the activity is measured biologically by the diffusion method using *Staphylococcus aureus* as a sensitive microorganism and with reference to a sample of pure 8036 R.P. as standard. This activity is expressed in units (u.) per mg. of solid products, and units per cc. for solutions (the "unit" is defined as the minimum amount of 8036 R.P. which, dissolved in 1 cc. of the appropriate culture medium, inhibits growth of *Staphylococcus aureus* 209P under the specified conditions).

EXAMPLE I

A 170-litre fermentation vessel is charged with

NZ amine, type E—1,200 g.
meat extract—720 g.
hydrated glucose—1,200 g.
soya oil—60 cc.
agar—120 g.
water—to make up to 105 litres After the pH of the mixture has been adjusted to 7.05 by addition of 90 cc. of 10 N sodium hydroxide solution, the medium is sterilised by bubbling steam through it at 122° C. for 40 minutes. After cooling, the broth has a volume of 120 litres and a pH of 6.90. The medium is then inoculated with 200 cc. of a culture of the strain *Streptomyces canadiensis in* an agitated Erlenmeyer flask. The culture is developed at 27° C. for 32 hours with agitation and aeration with sterile air; it is then ready for inoculating the production culture.

The production culture is carried out in an 800-litre fermentation vessel charged with the following substances:

corn-steep—8 kg.
hydrated glucose—4 kg.
soya oil—8 litres
calcium carbonate—4 kg.
ammonium sulphate—0.400 kg.
cobalt chloride hexahydrate—6 g.
water—to make up to 370 litres The medium, which has a pH of 6.20, is sterilised by bubbling steam through it at 122° C. for 40 minutes. After cooling, the broth has a volume of 400 litres and its pH is 7.10. Innoculation is carried out with 40 litres of the inoculum culture in the 170-litre fermentation vessel described above. Culture is preformed at 27° C. for 156 hours with agitation by means of a turbine turning at 260 revolutions per minute (r.p.m.) and aeration with sterile air at the rate of 15 cubic metres per hour. The pH of the medium is then 7.25 and the volume is 400 litres. The amount of antibiotic present in the fermentation medium is 1,625 u./cc.

EXAMPLE II

The culture is carried out at 33° C. for 156 hours in an 800 litre-fermentation vessel charged as described in Example I and inoculated with the same inoculum, the culture medium being agitated with the aid of a turbine turning at 160 r.p.m. and aerated with sterile air at the rate of 25 cubic metres per hour. The pH of the medium is then 7.45 and the volume is 340 litres. The amount of antibiotic present in the fermentation broth is 3,215 u./cc.

EXAMPLE III

The fermentation broths prepared as described in Examples I and II are mixed. 740 litres of medium containing 2,420 u./cc. at pH 7.3 are adjusted to pH 2 by the addition of 10 N sulphuric acid solution in a vat provided with a stirrer, and 18 kg. of a filtration assistant are added. The mixture is filtered through a filter press and the filter cake is washed with 250 litres of tap water. The practically inactive filtrate and washings are discarded. The filter cake is suspended by agitation in 388 litres of a mixture of methanol (268 l.) and water (120 l.). The apparent pH of the suspension is adjusted to pH 7 by addition of 10 N sodium hydroxide solution, stirring is continued for one hour, and the mash then filtered through a filter press. The filtrate is collected and the filter cake washed with 150 litres of 70% methanol by volume. The combined filtrate and washings (530 litres) contain 3,440 u./cc. The filter cake is discarded. The alcoholic filtrate is concentrated under reduced pressure (20 mm. Hg) at 35° C. to a volume of 5.2 litres.

The antibiotic is precipitated by the addition of 40 litres of ethanol. The precipitate is filtered off, washed with ethanol, and then dried in an oven under reduced pressure (5 mm. Hg). There are thus obtained 885 g. of a light grey product containing 1,790 u./mg.

EXAMPLE IV 880 g. of crude antibiotic prepared as described in Example III are dissolved in 20 litres of water at pH 7. The aqueous solution is filtered and then poured through a column containing 35 litres of Dowex 1 X 2 ion exchange resin (cl⁻ form), and the effluent is discarded. The resin is washed with 50 litres of water, followed by 80 litres of a mixture of water and formic acid (90:10 by volume), followed by 80 litres of a mixture of methanol-water-formic acid (80:10:10 by volume), and finally by 80 litres of a mixture of methanol and water (80:20 by volume). The antibiotic is thereafter eluted with 300 litres of the methanol-water mixture (80:20 by volume) containing 10 g. of potassium chloride per litre.

The middle fraction, the volume of which is 120 l., is concentrated to 5 l. under reduced pressure (20 mm. Hg) at a temperature below 40° C. The concentrate is dialysed for 24 hours against a current of distilled water through a regenerated cellulose membrane to eliminate inorganic salts and various organic impurities.

The dialysed solution (6.8 l.), which contains all of the activity of the eluate, is concentrated under reduced pressure (20 mm. Hg) to 0.8 l. The resulting concentrate is treated with 5 volumes of acetone and the potassium salt of the antibiotic precipitates. After filtration, washing with acetone and drying overnight at 35° C. under a pressure of 2 mm. Hg, there are obtained 195 g. of a light brown powder containing 5,680 u./mg.

EXAMPLE V 10 g. of the antibiotic in the form of its potassium salt containing 5,000 u./mg. obtained as described in Example IV, are dissolved in 100 cc. of a mixture of n-propanol and water (50:50 by volume). The solution obtained is passed through a column containing 20 g. of alumina at pH 4, and the antibiotic is eluted with the same solvent mixture.

The first 400 cc. of eluate are concentrated to 10 cc. under reduced pressure (20 mm. Hg) at a temperature below 40° C. and the concentrate obtained is then dialysed for 24 hours against a stream 20 times its volume of distilled water using a regenerated cellulose membrane, in order to eliminate inorganic salts and various organic impurities.

On addition of 10 volumes of acetone to the dialysed solution the potassium salt of the antibiotic is precipitated. It is filtered off, washed with acetone, and dried overnight at 35° C. under a pressure of 2 mm. Hg. There are obtained 2 g. of a practically white powder containing 8,800 u./mg.

EXAMPLE VI 175 g. of the antibiotic obtained as described in Example IV are dissolved in 3.5 l. of water at pH 7. The aqueous solution is poured through a column containing 15 litres of Dowex 1 X 2 resin (Cl$^-$ form) and the effluent is discarded. The resin is successively washed with 15 litres of distilled water, 20 l. of a mixture of water and formic acid (90:10 by volume), 40 l. of a mixture of methanol-water-formic acid (80:10:10 by volume) and 20 l. of a mixture of methanol and water (80:20 by volume). The antibiotic is eluted with 75 l. of a mixture of methanol and water (80:20 volume) containing 10 g. of potassium chloride per litre.

The middle fraction of the eluate of 40 l. is concentrated to 1.1 l. under reduced pressure (20 mm. Hg) at a temperature below 40° C. The concentrate is dialysed for 24 hours against a stream of distilled water through a regenerated cellulose membrane.

The dialysed solution (1.5 l.), which contains all the active material of the middle fraction of the elate, is concentrated under reduced pressure (20 mm. Hg) to 200 cc. The concentrate so obtained is treated with 5 volumes of acetone, and the potassium salt of the antibiotic is precipitated.

The precipitate is filtered off, washed with acetone, and dried overnight at 35° C. under a pressure of 2 mm. Hg. 98 g. of the potassium salt of the antibiotic are obtained as a practically white powder containing 8,000 u./mg.

EXAMPLE VII 9.25 g. of the potassium salt of the antibiotic obtained as described in Example V are dissolved in 0.5 l. of water. The solution is agitated to a constant pH of 1.5 with Amberlite I R 120 ion-exchange resin (acid form) added in small portions (32 g. total). The resin is filtered off, and washed by stirring with 100 cc. of water; the filtrate and the washings are combined. The solution obtained is freeze-dried to yield 7.2 g. of purified antibiotic in the form of the free acid containing 8.600 u./mg. Its elementary composition is as follows (percent):

$C=47.85–48$; $H=7.10$; $N=4.45–4.50$; $P=2.20$; $O=38.20–38.40$ (by difference).

EXAMPLE VIII 27.75 g. of the potassium salt of the antibiotic obtained as described in Example V are dissolved in 1.5 l. of water and treated with 100 g. of Amberlite I R 120 (acid form) as described in Example VII. The acid solution obtained is adjusted to pH 7 by the addition of 24.6 cc. of N sodium hydroxide solution. The neutral aqueous solution is freeze-dried to yield 19.6 g. of the sodium salt of the antibiotic. Its elementary composition is as follows (percent):

$C=45.25–45.3$; $H=6.55–6.90$; $O=38.3–38.8$; (by difference); $N=4.15–4.25$; $P=2.10$; $Na=3.15$.

EXAMPLE IX 5 g. of the potassium salt of the antibiotic containing 8,000 u./mg., prepared as described in Example VI, are dissolved in 50 cc. of a mixture of n-propanol and water (50:50 by volume). The solution is passed through a column containing alumina in suspension at pH 4 in a mixture of n-propanol and water (75:25 by volume). The antibiotic is eluted with 200 cc. of a mixture of n-propanol and water (50:50 by volume) followed by 200 cc. of a mixture of n-propanol - water - concentrated ammonia solution (d.=0.925) (50:49.5:0.5 by volume). The eluate is collected in 10 cc. fractions and the activity of each fraction determined by biological estimation.

The rich fractions of the n-propanol-water (50:50 by volume) eluate, fractions 3 to 11, are recombined and concentrated under reduced pressure (20 mm. Hg) without exceeding 40° C. to a volume of 10 cc. The concentrate is diluted with 10 cc. of n-propanol and 10 cc. of acetone, and the antibiotic is precipitated. After filtration, washing with acetone and drying overnight at 35° C. under a pressure of 2 mm. Hg, 2.4 g. of the white potassium salt of the antibiotic containing 9,150 u./mg. are obtained.

The rich fractions of the n-propanol-water-concentrated ammonia (50:49.5:0.5 by volume) eluate, namely fractions 23 to 40, are combined and treated in the manner described above to yield 1.5 g. of a slightly coloured powder containing 8,500 u./mg. The present invention includes within its scope pharmaceutical compositions containing 8036 R.P., as such or as a non-toxic salt thereof, in association with a compatible pharmaceutically acceptable carrier, which may itself be physiologically active. Such compositions may be in any pharmaceutical form suitable for the route of administration envisaged and will ordinarily contain 5 to 95% by weight of the antibiotic compound.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agent. They may be sterilised by, for example, filtration through a bacteria-retaining filter, by incorporation in the compositions of sterilising agents, or by irradiation.

The antibiotic may also be put up for clinical use as a sterile solid which can be dissolved in sterile water or some other sterile injectable medium immediately before use.

The proportion of active principle contained in the above-mentioned composition may be varied to suit the desired therapeutic effect. For treatment of infections by Gram-positive bacteria by intramuscular or intravenous administration, the dose is generally from 0.25 to 1.5 g.

for adults. This dose may be repeated eight days later if the need should arise.

The following example illustrates a pharmaceutical composition according to the invention.

EXAMPLE X

A solution is prepared which contains 50 g. of the sodium salt of 8036 R.P. in distilled water to make the volume of the solution 500 cc. This solution is sterilised by filtration through a bacteriostatic filter, and is then charged into ampoules (5 cc. per ampoule). The solution in the ampoules is then freeze-dried and the ampoules are sealed. For parenteral administration, the contents of the ampoules are dissolved immediately before use in 5 cc. of distilled water to make an injectable solution. In this manner, there are obtained about 5 cc. of solution containing 0.5 g. of the antibiotic.

We claim:

1. The antibiotic herein designated 8036 R.P., a white amorphous powder, which is an acid of pKa=4.45 having an neutralisation equivalent of about 775, soluble in water, dimethylformamide, pyridine and acetic acid and sparingly soluble or insoluble in ethanol, acetone, chloroform and n-hexane, which melts at 235–236° C. with decomposition and has the elementary analysis C=47.9%, H=7.1%, O=38.3%, N=4.5% and P=2.2%, which in its ultra-violet spectrum as determined on a 0.005% w./v. aqueous solution shows no characteristic maximum and the absorption coefficient $$E^{1\%}_{1\,cm.}$$

increases from zero to 40 from 400 to 210 millimicrons, and in its infra-red spectrum determined on a tablet of a mixture with potassium bromide shows the following maxima: 3400 very strong, 2930 strong, 1725 strong, 1660 strong 1650 strong, 1550 strong, 1445 shoulder, 1400 shoulder, 1380 strong, 1335 strong, 1225 strong, 1150 shoulder, 1100 shoulder, 1070 very strong, 1032 shoulder, 970 strong, 945 shoulder, 880 strong, 855 shoulder, 815 medium, 775 shoulder and 755 shoulder or salts of the said antibiotic with non-toxic cations.

2. A salt of 8036 R.P. according to claim 1, the cation of which is alkali metal.

3. A salt of 8036 R.P. according to claim 1, the cation of which is sodium and the salt is a white amorphous powder, having the elementary analysis C=45.3%, H=6.7%, O=38.55%, N=4.2%, P=2.1% and Na=3.15%, which in its ultra-violet spectrum as determined on a 0.005% w./v. aqueous soution shows no characteristic maximum and the absorption coefficient $$E^{1\%}_{1\,cm.}$$

increases from zero to 60 over the intervals of 400 to 210 millimicrons, and in its infra-red spectrum as determined on a tablet of a mixture with potassium bromide shows the following maxima: 3430 very strong, 2940 strong, 1725 strong, 1660 strong, 1645 strong, 1610 strong, 1555 shoulder, 1455 shoulder, 1330 strong, 1238 strong, 1150 shoulder, 1100 shoulder, 1070 very strong, 1045 shoulder, 968 strong, 943 strong, 890 shoulder, 882 medium, 855 medium, 820 medium and 776 strong.

4. Process for the production of the antibiotic 8036 R.P. which comprises aerobically cultivating *Streptomyces canadiensis* (NRRL 3155), on an aqueous nutrient medium containing assimilable sources of carbon, nitrogen and inorganic substances until sufficient antibacterial activity is imparted to said medium, and separating the 8036 R.P. formed during the cultivation.

5. Process according to claim 4 wherein 8036 R.P. is separated from the culture medium by adjusting the pH of the medium to about 2, filtering and extracting the filter cake with water containing methanol, ethanol, propanol or mixtures thereof, at a pH of 3 to 7.

6. Process according to claim 4 wherein the culture is effected under submerged aerobic culture conditions commencing at a pH within the range 6.0 to 7.8 and at a temperature from 23° to 38° C. for from 4 to 9 days.

7. Process according to claim 4 wherein the culture is effected under submerged aerobic culture conditions commencing at a pH within the range 6.5 and 7.5 and at a temperature from 23° to 38° C. for from 4 to 9 days.

8. Process according to claim 4 wherein the temperature of the culture medium is from 25° to 35° C.

9. Process according to claim 4 wherein the culture medium is aerated at a rate of from 0.3 to 2 litres of air per litre of medium per minute.

10. Process according to claim 4 wherein 8036 R.P. is separated from the culture medium by adjusting the pH of the medium to below 4 and treating the medium with butanol.

References Cited

Derwent Farm Doc. No. 21,495, Abstracting South African Patent No. 65/6204, published May 18, 1966.

JEROME D. GOLDBERG, Primary Examiner

U.S. Cl. X.R.

195—80